United States Patent [19]

Burchart

[11] Patent Number: 4,836,784
[45] Date of Patent: Jun. 6, 1989

[54] UNIT FOR DISPLAY OF INFORMATION ON A READING DEVICE FOR THE BLIND

[75] Inventor: Joachim Burchart, Schlangen, Fed. Rep. of Germany

[73] Assignee: Nixdorf Computer AG, Paderborn, Fed. Rep. of Germany

[21] Appl. No.: 688,583

[22] Filed: Jan. 3, 1985

[30] Foreign Application Priority Data

Jan. 3, 1984 [DE] Fed. Rep. of Germany ....... 3400093

[51] Int. Cl.$^4$ ............................................. G09B 21/00
[52] U.S. Cl. ...................................................... 434/113
[58] Field of Search ................... 346/21; 434/113, 114, 434/115; 364/523

[56] References Cited

U.S. PATENT DOCUMENTS

| | | | |
|---|---|---|---|
| 3,197,889 | 8/1965 | Micropoulou | 434/113 |
| 3,594,787 | 7/1971 | Ickes | 434/114 X |
| 3,624,772 | 11/1971 | Grunwald | 434/114 X |
| 3,736,672 | 6/1973 | Skewis | 434/114 |
| 4,475,162 | 10/1984 | Kitamura | 364/523 |
| 4,504,825 | 3/1985 | Bergermann | 364/523 X |

*Primary Examiner*—William H. Grieb

*Attorney, Agent, or Firm*—Cullen, Sloman, Cantor, Grauer, Scott & Rutherford

[57] ABSTRACT

The invention relates to a device for displaying information on a reading unit for the blind. Instead of character fields arranged with certain spacings apart from one another for displaying Braille characters, the reading table is occupied by a dense matrix of character elements (4) with uniform line and column spacings. In the totality of character elements, certain character fields (6) are provided which serve for displaying the Braille characters. These are surrounded by other character elements which are not set in the displaying of Braille text, so that the Braille characters have the required spacing apart from one another. The whole reserve of character elements (4) is used for reproducing large-area graphics, large symbols, tables or the like. With a certain arrangement, described in detail, of the character elements, all of the information displayable on a viewing screen can be reproduced on the reading table, with the exception of reverse-brightness information and that displayed in colors.

A number of embodiment examples are described which are intended especially for reproducing video text or viewing screen texts on a reading unit for the blind.

16 Claims, 3 Drawing Sheets

UNIT FOR DISPLAY OF INFORMATION ON A READING DEVICE FOR THE BLIND

This application is related to copending application Ser. No. 688,584 filed Jan 3, 1985 in the name of Joachim Burchart and assigned to Nixdorf Computer AG of Paderborn, West Germany.

FIELD OF THE INVENTION

The invention relates to a tactile reading apparatus for the blind which is capable of displaying both graphics and alphanumeric characters.

BACKGROUND OF THE INVENTION

In such reading tables a plurality of character fields is generally provided each of which shows the number of character elements required for displaying one Braille character. These character fields, also known as Braille forms, are assigned to one or even more Braille lines on the reading table. For a distinct separation of the characters from one another, spaces are provided between adjacent Braille forms which are larger than the spacing between two rows of points in one character.

With an arrangement of this kind, generally only characters provided in Braille code, e.g. alphanumeric characters, can be reproduced. Larger graphic displays or the like extending out beyond the individual Braille forms cannot however be reproduced or be reproduced free of distortion by reason of the character elements arranged in the fields. Hence, the conventional reading tables in particular are unsuited for the reproduction of video text pages, viewing screen text pages or the like, which generally contain letter and graphic displays.

A unit is already known for reproducing video text pages for the blind which serves for reproducing a viewing screen line in writing readable by the blind (German Offenlegungschrift No. 3,112,438). This viewing screen line can be reproduced in one or a plurality of Braille lines. Hence, in this known apparatus all characters which are not letters provided in Braille code are suppressed. Any reproduction of graphic displays or of large letters composed of graphic symbols or the like is impossible with this unit.

SUMMARY OF THE INVENTION

It is the problem of the present invention to create a unit of the type of this species which also permits the display of graphics extending out beyond the individual Braille form, large letters and the like and which for this reason is particularly suitable for representing video text pages, viewing screen text pages or the like.

This problem is solved according to the invention by providing a reading board or the like having a reading surface which contains a dense two-dimensional array of uniformly spaced character elements each of which is susceptible of both raised and lower dispositions relative to the surface and further by providing input and encoder means responsive to alphanumeric character data to actuate only certain sub-arrays but responsive to graphic input data to ignore the sub-array division and effectively access the entire board.

The character elements are arranged in a dense matrix with uniform line and column spacings, that is, the whole reading table is uniformly occupied by character elements. For the display of characters in Braille print, certain respective character fields are used which are separated from each other by at least one row of character elements. Each of these character fields is intended for the display of one Braille print character. The character elements arranged between the character fields and separating these have no function, that is they are cleared, so that distinct spaces exist between the individual characters. For the display of graphics or the like all of the character elements can be used, whereby, depending on the arrangement density of the character elements, a more or less good definition is obtained.

For displaying video text pages, viewing screen text pages or the like, it is provided in one development of the invention that the reading table shows a number and arrangement of character fields corresponding to the number and arrangement of the characters of a viewing screen page.

By the present standard the viewing screen page has 24 lines each with 40 characters. The reading table then likewise shows 24 lines with 40 character fields each, where the individual character fields are respectively surrounded on all sides by other character elements either in one row or else in a number of rows, as has already been described.

In order for the display of one viewing screen page to come as close as possible, it is further provided according to the invention that the inner character fields are formed as Braille forms preferably with 8 character elements and that each Braille form is framed on all sides with one row of character elements and are completed to form a partial matrix or an outer character field with preferably 4×6 character elements. The characters represented on the viewing screen by a 5×10 matrix are reproduced by a Braille form with 2×4 character elements.

Each outer character field with 4×6 character elements can also be conceived of as a matrix block which respectively contains 2×3 matrix elements, where each of the matrix elements in turn is composed of 2×2 character elements. Such matrix block is particularly suitable for the reproducing of graphic symbols used in the video text or viewing screen text process for the composition of graphics, as is described in more detail further on. It may be mentioned that the division of the totality of all the character elements into individual partial matrices or character fields need not be externally visible. This division instead can be done purely by organizing the circuit details and serves only for determining defined character fields for the display.

In a preferred development of the invention the means for setting and clearing the character elements include the operating drives respectively assigned to these as well as a control unit for driving these operating drives. The control unit shows a memory unit which can be connected to a viewing screen unit or the like for storing at least the information signals forming one viewing screen page and a character generator for converting these information signals into a tactile character pattern corresponding to the viewing screen page as well as for driving the character elements corresponding to this character pattern. Viewing screen units here is understood to mean quite generally all units suitable for generating viewing screen pages, and thus for example, also receiving components provided with video text or viewing screen text decoders, such as video recorders or the like. The information signals corresponding to the viewing screen page are accepted in that memory unit and fed to a character generator which converts these information signals into a character pattern displayable on the reading table. The character elements of the reading table are set according to this character pattern.

According to present standards the viewing screen page is divided into 24 lines of 40 characters each. A reading table intended for reproducing a whole viewing screen page accordingly shows 24×40 character fields with 4×6 character elements each, in the character element arrangement described above, that is a total of 23,040 character elements. In order to keep within limits, the expense for the setting and clearing of the character elements as well as for retaining these in their set or cleared position despite the plurality of character elements, it is provided that the character elements in their set or cleared position assume inherently stable positions; pistons acting in the setting or clearing direction serve as means for setting or clearing the character elements. These may retract after the setting or clearing operation, since they must apply no retaining force. This solution moreover respectively enables a plurality of character elements to be operable one after another by means of at least piston which can move relatively to these in the plane of the reading table. It is conceivable for example for a single piston to sweep over the whole reading surface in the manner of a print head and operate one after another all of the character elements to be set. But in order to accelerate the write operation, in a preferred development of the invention, a row of pistons arranged, for example, for setting the character elements corresponding to one line or one column of the reading table is provided and the reading table and the row of pistons are movable relative to each other in the column direction or in the line direction. In this way all the character elements of one column or one row can be operated simultaneously; by a stepwise movement of the reading table or of the row of pistons in the line direction or the column direction, the whole reading table can be described.

In an especially simple design, the character elements are formed as cap-like knobs made of an elastic material and projecting out of the reading table in their set position, which knobs can be retracted for clearing. The retracted or protruding positions of the knobs are relatively inherently stable positions which cannot be altered by the finger of the person reading. Yet the force required for retraction or protrusion of the knobs is small, so that the operating drives for moving the pistons can be kept small.

In a further development of the invention, it is provided that the reading table is made as an endless belt movable in the line direction or in the column direction and that the rows of pistons are respectively arranged stationary. The belt movable in the line direction moves out over a row of pistons arranged in the column direction; a belt movable in the column direction accordingly moves out over a row of pistons arranged stationary in the line direction, as will be described in detail further on.

With the unit according to the invention, all of the characters of the viewing screen text or video text system are displayable with the exception of colors and inverse-brightness character display. Since the character inversion generally contains no essential information, it is provided that the control unit shows means for suppressing the inversion command.

In a further development of the invention, the control unit also contains means for suppressing characters of one or a plurality of predetermined colors displayable on the viewing screen, so that only video information of a desired color is displayed on the reading table. Complicated graphics can be unravelled in this way.

Frequently color areas blend with one another in a viewing screen text. If, for example, only the light-dark information in the graphic symbols is to be evaluated in this case, the pictures can no longer be detected by touch. But if the color information in the video text or viewing screen text signal is also to be evaluated, then the setting of the knobs in the color area can be suppressed and only the characters with an adjacent character of another color are set. Flat graphics then appear only as contour pictures.

For this purpose, the control unit shows means for the selective display of characters arranged on the boundary of certain color fields on the viewing screen page as well as for suppressing the characters arranged inside these color fields.

Besides this, the control unit may show means which permit selectively displaying only the alphanumeric characters or the graphic characters of a viewing screen page containing both types of characters. In this manner it is possible to view the graphics alone without being annoyed by the text scattered through this. The text can then be called up as a succeeding picture.

In a further development of the invention, the control unit contains means for the enlarged display of sectors of a viewing screen page on the reading table.

A number of embodiment examples of the invention are represented in the drawings and described in detail in the following. In these:

DETAILED DESCRIPTION OF THE PREFERRED EMBODIMENT

Figure 1:
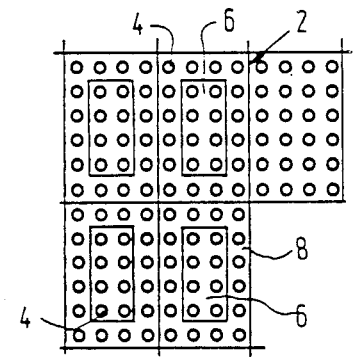
FIG. 1 shows a segment of a reading table with a division of the character elements intended for the displaying of print characters.

FIG. 1 shows a sector of a reading table which is occupied by a plurality of character elements 4. The character elements are arranged in lines and columns with a uniform line and column spacing. The totality of the character elements defines certain inner character fields 6 which are intended for the representation of one Braille character each. In the embodiment example represented in FIG. 1, each of the inner fields 6 respectively contains 2×4 character elements and thus corresponds to the known arrangement for representing the 8-point Braille code. Each of the inner character fields 6 is surrounded on all sides by one row of character elements and is completed for an outer character field 8. Each outer character field 8 contains 4×6 character elements.

For the representation of characters, only the inner character fields 6 are used, while the character elements framing these are cleared. Thus, the inner character fields 6 have a distinct spacing apart from one another, so that the Braille characters do not flow together. As was already described above, the arrangement and number of character fields on the reading table 2 correspond to the arrangement and number of characters n a viewing screen page in the video or viewing screen text system. Accordingly, 24 lines of 40 outer character fields 8 each are provided.

Figure 2:
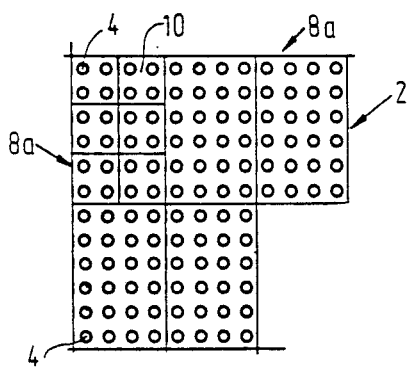
FIG. 2 shows a segment of a reading table with a division of the character elements laid out preferentially for the displaying of graphics.

The segment of the reading table 2 represented in FIG. 2 corresponds to the segment represented in FIG. 1. In turn, individual fields can be defined in the totality of the character elements. In the present case these fields correspond to the outer character fields 8 according to FIG. 1. Each of these character fields can be considered as a matrix block 8a with 2×3 matrix elements 10 each, as is represented in FIG. 2, upper left. Each matrix element 10 in turn is formed by a 2×2 matrix of character elements 4. It may be mentioned once more at this point that the division of the totality of character elements into single fields is to be understood as purely organizational and for example is done by way of constructional details or control technique. The boundary lines of the separate fields as represented in FIGS. 1 and 2 do not really exist but rather serve only for better visibility. The matrix block 8a in FIG. 2 is particularly suited for reproducing the graphic symbols used in video text and viewing screen text pages which as is known show 2×3 picture elements each and which likewise occupy the area of a print character. Accordingly, all of the graphic symbols can be readily displayed on the reading table 2, for example, by having dark picture elements represented by set character elements and bring picture elements represented by cleared and character elements.

Figure 3:
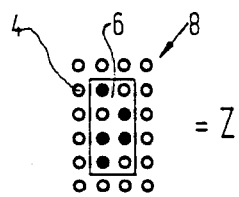
FIGS. 3 to 6 show different representations of characters in a character field of the reading table.

FIGS. 3 to 6 respectively show a character field 8 and 8a with characters represented in these character fields. In FIG. 3 only the inner character field 6 is used for representing a character in Braille code.

Dark points correspond to set character elements, bright points to cleared character elements. The character represented is the capital letter Z in Braille print. The character elements 4 framing the inner character field 6 are cleared. In this way each Braille form is separated by two point spacings from the adjacent form, so that the separate characters do not flow into each other.

Figure 4:
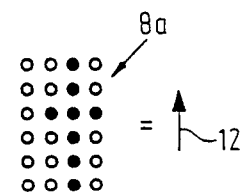

FIG. 4 shows a character field 8a in which symbols which go out beyond the Braille form but are displayable within one character field can be reproduced. FIG. 4 shows as an example the reproduction of the arrow symbol 12 displayed beside the character field.

Figure 5:
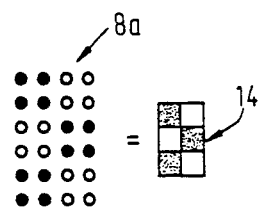

In FIG. 5 the character field according to FIG. 2, upper left, is divided into 2×3 matrix blocks. The graphic symbol 14 displayed beside the character field 8a, which symbol is used on viewing screen pages for displaying large-area graphics, is displayed on the reading table in the manner presented in FIG. 5.

Figure 6:
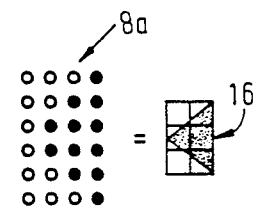

FIG. 6 shows a character field 8a in which the graphic symbol 16 displayed at the right next to this character field is reproduced from the enlarged video text character set provided.

Only a coarse definition of graphic symbols is possible with the character field of 4×6 character elements, mentioned only as an example. 4×6 points represent the minimum number of points. A better definition is possible by increasing the number of points; an odd number of rows and columns permits a symmetrical structure of characters with oblique lines, but rectangular symbols are distorted. Since the point spacing cannot be reduced to below a certain minimum without impairing the readability, an increase in the number of points is attainable only by enlarging the reproduction field. The danger here is that the character field will become indistinct.

Figure 7:
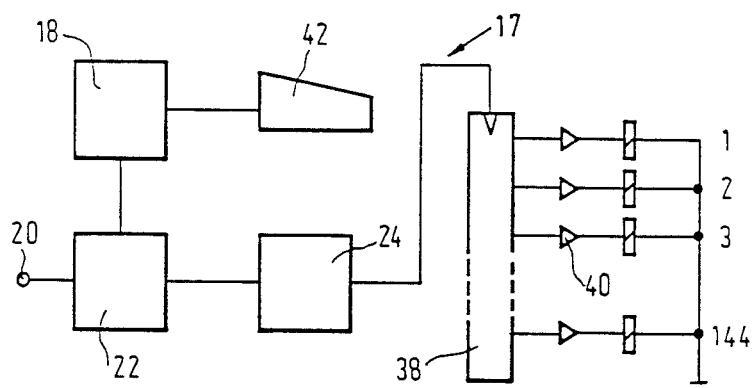
FIG. 7 diagrammatically shows a control unit for describing a reading table.

FIG. 7 diagrammatically shows a control unit 17 for driving a tactile reading table intended for the reproduction of viewing screen pages. Under the control of a microprocessor 18, the picture information signals applied to the input terminals 20 are loaded into the page memory 22. From there they reach a character generator 24 which converts the picture information signals into the dot screen code of the reading table. The character generator, in a suitable manner described in more detail below, drives the operating drive for the character elements until the viewing screen page is transferred to the reading table.

Figures 8, 9:
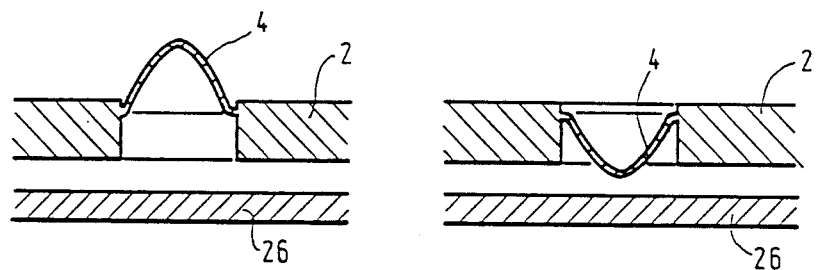
FIG. 8 shows a single character element in a longitudinal section in the set position.
FIG. 9 shows a character element in the cleared position.

In order to accommodate the number of characters required for the display of one viewing screen page, on a reading table witn ergonomically rational dimensions, the character elements and especially their operating drive must be made in a very simple form. FIG. 8 shows a lengthwise section of a character element 4, which is in the form of a cap-like knob made of an elastic material and projecting out of the reading table 2 in its set position. For clearing, this knob can retract, a FIG. 9 shows. Simple pistons acting on the setting direction and the clearing direction may, for example, be used for operating the knobs, the lateral space requirement for which pistons does not extend out beyond the knobs. The knobs 4 are made integral with the reading table 2 and made of an elastic material. A solid base plate 26 serves for supporting the elastic reading table, for example.

Figure 10:
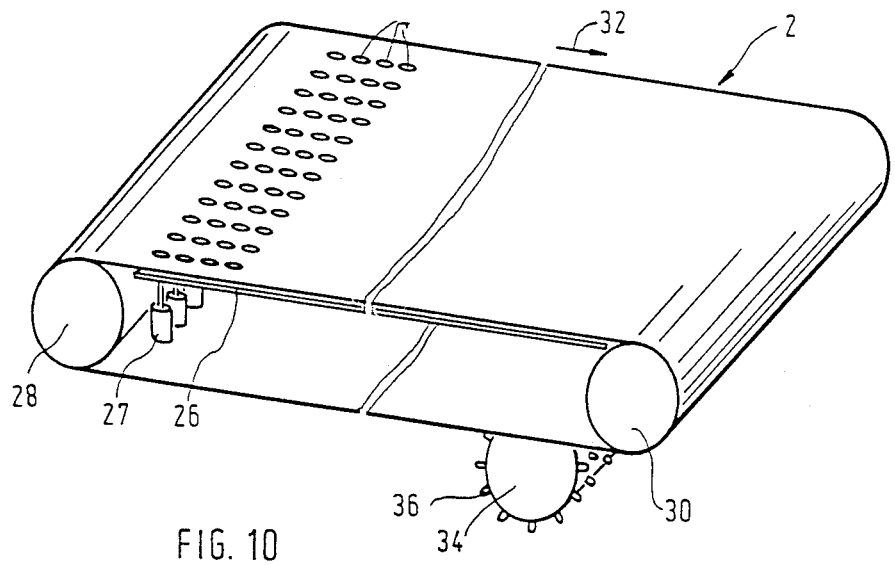
FIG. 10 shows a reading table made as a belt movable in the line direction.

FIG. 10 shows a reading table 2 which is made as an endless belt moving in the line direction. This is guided over two deflector rollers 28,30. In the reading region the belt runs over a solid base plate 26. Pistons 27 arranged under the top side of the belt 2 in the column direction serve for setting the character elements 4, which pistons at the same time can operate the character elements of one column. After the setting of one column, the belt 2 moves on in the direction of the arrow 32 by the amount of one point spacing, so that the next column can be written, until the whole reading table is written. A clearing roller 34 situated against the lower side of the belt 2 serves for clearing the character elements, the surface of which roller is equipped with projections 36 corresponding t the arrangement of character elements on the belt 2. These projections retract the character elements 4 back into their cleared position, as FIG. 9 shows. The projected or retracted position of the knobs 4 is inherently stable, so that they cannot be reset by the feeling pressure of the finger of the person reading. Therefore, any measures for holding the knobs stationary in their respective positions are unnecessary.

Figure 11:
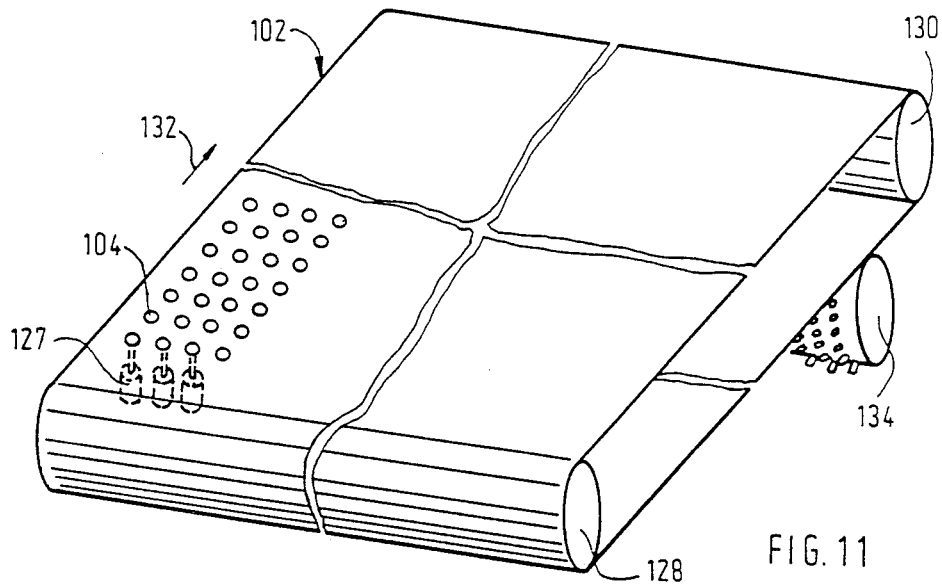
FIG. 11 shows a reading table made as a belt movable in the column direction.

FIG. 11 shows a reading table 102 which is formed as an endless belt moving in the column direction. It is guided over deflector rollers 128,130 and is moved in any desired manner, not represented in detail, in the direction of the arrow 132. Operating pistons 127 are arranged under the top side of the belt 102 in the line direction, which pistons can respectively set a line of knobs at the same time. By this arrangement, the picture of the text appears on the reading table by lines. This offers the capability, especially in reproducing texts in Braille print, of reading the lines written before the whole table is written. In turn, clearing roller 134 situated under the under side of the belt 102 serves for clearing the character elements 104.

While the picture information of the viewing screen unit is being loaded character-for-character and line-for-line in the page memory 22 (see FIG. 7) the transfer to the reading tables according to FIGS. 10 and 11 is done in such a way that the knob columns and knob lines are set one after another. This will be explained in the example of reading table according to FIG. 10. The character generator 24 outputs the dot screen code for the first column of knobs on the left side of the reading table 2 and loads it in a shift register 38. Each of the 144 positions, for example, in the shift register 38 corresponds to a piston 27 (as was explained before, the reading table 2 shows 24 character field lines with 6 knob lines each). After the shift register 38 is loaded, the operating pistons 27 are driven by way of amplifiers 40 in accordance with the dot screen code of this first column of knobs. Then a column counter located in the character generator is advanced by one step and the second column is set in accordance with its dot screen code, etc., until the whole reading table 2 is written.

A control keyboard 42 is connected to the microprocessor 18. With this keyboard control commands can be output such as:

new picture;

suppress all characters of one color (for better readability of color graphics with colors interlaced with one another);

enlarged display of one part of a picture; etc.

Not only can video and viewing screen text be displayed on the reading table but also information such as maps, city plans, etc. The reading table is also suitable for instruction purposes. Thus, for example, print characters can be depicted as two-dimensional tactile representations of the black-and-white characters beside the equivalent Braille characters.

I claim:

1. Apparatus for producing tactile-readable representations of graphics and alphanumeric characters comprising:

a reading board having a surface containing a dense two-dimensional array of uniformly spaced character elements therein;

each of said elements being susceptible of both raised and lower dispositions relative to said surface;

said array being divisable two-dimensionally into an integral number of multi element sub-array separated from one another by borderlines of said elements;

actuator means arranged adjacent to said board for setting the dispositions of all of said elements in said array;

input means for receiving data representing graphics and character arrays;

encoder means connecting said input means to said actuator means responsive to graphics for potentially actuating all of the elements in said array but responsive to character inputs for excluding from actuation the elements in said borderlines of elements whereby only the elements of said sub-arrays are actuable in response to character inputs;

and means for clearing said board by disposing all of said elements in the lowered disposition.

2. Apparatus as set forth in claim 1 wherein the reading board is a relatively thick elastic material and the character elements are areas of thin elastic material capable of assuming stable dome-like convex and concave conditions and being physically switched between said conditions.

3. Unit as claimed in claim 1, characterized in that the reading surface (2) exhibits a number and arrangement of partial matrices (8,8a) corresponding to the number and arrangement of characters on one viewing screen page.

4. Unit as claimed in claim 1 characterized in that the sub-arrays (8,8a) are composed of 4×6 character elements (4) and the character field (6) are formed as Braille forms with eight character elements (4).

5. Unit as claimed in claim 1 characterized in that the actuator means include an electrical operating drive (27,127) and a control unit (17) for driving the operating drive.

6. Unit as claimed in claim 5, characterized in that the control unit (17) includes a memory unit (22) connectable to the viewing screen unit for storing at least the input signals forming one page of the viewing screen and a character generator (24) for converting these information signals into a character pattern corresponding to the page of the viewing screen and displayable on the reading board (2) as well as for driving the character elements (4) corresponding to this character pattern.

7. Unit as claimed in claim 6 characterized in that the control unit (17) includes means for suppressing the inversion commands for the display of reverse-brightness characters on the viewing screen unit.

8. Unit as claimed in claim 6 characterized in that the control unit (17) includes means for suppressing characters of one or a plurality of particular colors displayed on the viewing screen.

9. Unit as claimed in claim 6 characterized in that the control unit (17) includes means for the selective display of characters arranged at the boundaries of certain color fields of the viewing screen page as well as for suppressing the characters arranged inside these color fields.

10. Unit as claimed in claim 6 characterized in that the control unit (17) includes means for the selective representation of either only the graphic or the alphanumeric characters of one page of the viewing screen containing both types of characters.

11. Unit as claimed in claim 6 characterized in that the control unit (17) includes means for the enlarged display of sectors of a viewing screen page on the reading table.

12. Unit as claimed in claim 1 characterized in that the character elements (4) in their set or cleared position, respectively assume inherently stable positions and the actuator means comprises pistons (27,127) as means for the setting of the character elements.

13. Unit as claimed in claim 12, characterized in that a plurality of character elements (4) can be driven one after another by at least one piston (27,127) which can move relative to these in the plane of the reading board.

14. Unit as claimed in claim 13, characterized in that a row of pistons (27,127) is provided arranged corresponding to one line or one column and in that the reading table (2,102) and the row of pistons are respectively movable relative to each other in the column direction or in the line direction.

15. Unit as claimed in claim 14 characterized in that the reading board (2,102) is arranged as an endless belt movable in the line direction or in the column direction and in that the pistons (27,127) are respectively arranged stationary.

16. Unit as claimed in claim 12 characterized in that the character elements (4,104) are formed as projecting cap-like knobs of an elastic material projecting out of the reading board (2,102) in their set position.

* * * * *